United States Patent Office 3,183,210
Patented May 11, 1965

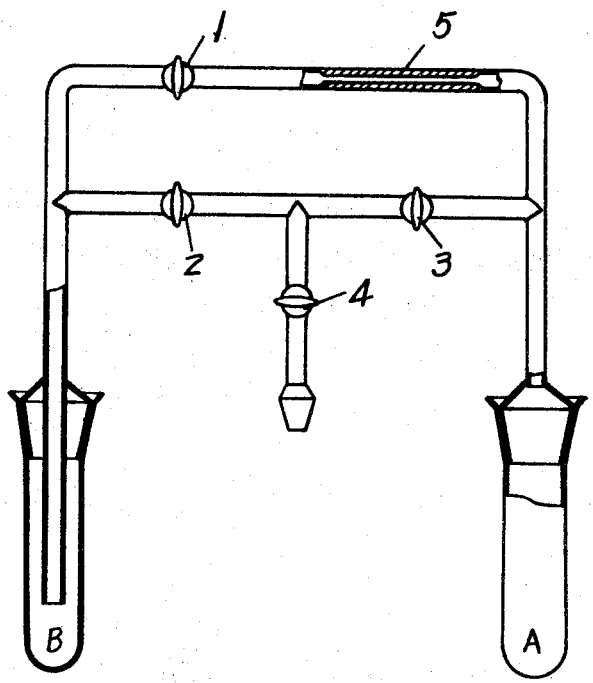

---

3,183,210
POLYMERIZATION OF ALDEHYDE BY ORGANO-METALLIC COMPOUND
Junji Furukawa and Takeo Saegusa, Kyoto, Japan, assignors to Zaidan Hojin Nihon Kagaku Seni Kenkyusho and Bridgestone Tire Company Limited, Kyoto, Japan, and Tokyo, Japan, respectively
Filed Aug. 15, 1960, Ser. No. 49,711
Claims priority, application Japan, Nov. 6, 1959, 34/34,618; Dec. 23, 1959, 34/39,908
7 Claims. (Cl. 260—67)

The present invention relates to a method of the preparation of high molecular weight polymers of aldehydes other than formaldehyde, and more particularly, to a method of using organometallic compounds as polymerization initiators for the preparation of such polymers.

It has heretofore been known that formaldehyde could be polymerized to high molecular weight polymers in the presence of some organometallic compounds as catalyst (e.g. British Patent 766,629).

For the polymerization of acetaldehyde it has been shown in the past or disclosed and claimed recently that there were several effective processes for the said polymerization such as "freeze-polymerization," in which the necessary procedure was to freeze acetaldehyde at a temperature below its freezing point −123.5° C., "adsorption-polymerization," in which the polymerization was effected at a temperature above freezing point of acetaldehyde in the presence of alumina or alumina-containing metal oxide compounds as catalysts, and the method in which persulphates were utilized as catalysts.

With perfluoroaldehyde (e.g. trifluoroacetaldehyde, heptafluoropropionaldehyde) it was disclosed and claimed in British Patent 719,877 that said perfluoroaldehyde could be polymerized to solid polymers with the use of acids or peroxides as catalysts.

The inventors have found that some organometallic compounds are useful as initiators in the polymerization of aldehydes other than formaldehyde. In general, it has been understood that aldehydes such as acetaldehyde react with organometallic compounds to give the corresponding secondary alcohols, "Grignard reaction" with the use of organo magnesium compounds is well known in organic synthesis reactions, showing the general formula in the following;

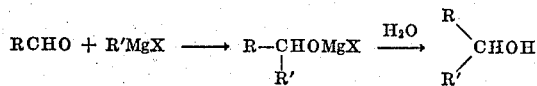

It was quite unexpected that the organo metallic compounds being reacted with aldehydes could be utilized as catalysts useful for the polymerization of said aldehydes to high molecular weight polymers, therefore the present invention provides an entirely new process of polymerization.

The high molecular weight poly "acetaldehyde" produced by the process of this invention has in general the superior thermostability to that in the prior arts, moreover the crystalline high molecular weight polymers can be produced under a proper condition.

According to the present invention, "monomer aldehyde" should be understood to include the compound of the general formula RCHO, wherein R represents a radical selected from aliphatic-, aromatic hydrocarbon radicals or radicals derived from said hydrocarbon radicals, and also the compounds with bi-aldehyde radicals, having the general formula of OHCR'CHO, wherein R' represents a hydrocarbon radical of valency 2 or a radical derived from said hydrocarbon radical of valency 2.

The polymerization initiator is the organometallic compound of the general formula $MRR'_{x-1}$, wherein M is a metal of valency X, R represents a radical selected from hydrogen, hydrocarbon radicals, and radicals derived from said hydrocarbon radicals, and R' represents a radical selected from hydrogen, hydrocarbon radicals, hydroxide, secondary amino radicals, the halogen, and oxygen of valency ½.

There is no restriction on the amount of said catalyst be usually the use of said catalyst is preferably from 0.01% to 100% by weight of said monomer aldehyde.

In accordance with the present invention a process for the preparation of high molecular weight polymers of aldehydes other than formaldehyde comprises making contact of the said organometallic compounds with said aldehyde monomers in or without solvents and maintaining the reaction mixture at a given temperature for a given time.

Solvents are not necessarily needed but the use of solvents gives the smooth reaction in many cases. Aliphatic-, aromatic hydrocarbons, ethers, halogenated hydrocarbons and other organic solvents not causing decomposition of said organometallic compounds are used as solvent the amount of which is not specially restricted in the process of the present invention.

On the method of making contact or mixing of said organometallic compounds with said aldehyde there is no special specification or restriction, and it can be accomplished by introducing vapor, liquid, or solution of said aldehydes into said organometallic compounds or their solutions in inert solvents or contrariwise by introducing said organometallic compounds in the state of gas, liquid, solid or solution into said aldehydes or their solution.

The polymerization is effected at a temperature below room temperature and usually below 0° C.

There is no special restriction on the amount of the catalyst and in general the use of said catalyst from 0.01 to $10^{-4}$% by weight of said monomer gives the good result.

Polymers made by the process of the present invention are of elastic or resinous solid or fluid substance, so that they are useful in the preparation of resins, rubbers and fibers.

The following examples illustrate preferred embodiments of this invention, but not limitative.

EXAMPLE 1

In the accompanying drawing, (A) represents a vessel for aldehyde monomer, (B) represents a reaction tube, 1, 2, 3 and 4 represent stopcocks, and 5 represents a capillary part. The air in said apparatus was purged with nitrogen, and the solution of 0.0125 mol. of diethylzinc in 20 ml. of n-hexane and 0.25 mol. of acetaldehyde were placed respectively in said reaction tube (B) and said vessel (A). (A) and (B) were immersed in Dry Ice-alcohol bath of −70° C., then evacuated to about 3 mm. Hg.

The stopcocks of 2, 3 and 4 were closed and (A) was removed from Dry Ice-alcohol bath to be allowed to warm to room temperature so that said acetaldehyde in (A) was volatilized and condensed in (B) through said capillary part 5.

The reaction tube (B) was kept at −70° C. for 22 hours.

The polymerization reaction mixture was washed with methanol, and the polymer was extracted with chloroform.

78 grs. of white solid polymer were obtained from said extract after distilling chloroform and the conversion was 70%. The polymer thus produced could be press-molded at about 150° C.

EXAMPLE 2

Acetaldehyde was polymerized under the same condition and according to the same method as in Example 1, except that triethylaluminum was used in place of diethylzinc. 6.5 grs. of white elastic polymer soluble in methanol were prepared and the conversion was 60%.

EXAMPLE 3

Acetaldehyde was polymerized by the same process as in Examples 1 and 2 with the use of various organometallic compounds as catalysts. The results are summarized in Table 1.

*Table 1*

| | |
|---|---|
| Acetaldehyde | 0.25 mol. (15 ml.). |
| Organometallic compound | 0.0125 mol. |
| n-Hexane | 30 ml. |
| Reaction temperature | −78° C. |
| Reaction time | 20 hours. |

| Organometalic compound | Yield of Polymer (Percent) | | | Sum. |
|---|---|---|---|---|
| | Soluble in methanol | Soluble in chloroform | Insoluble part | |
| Diethylzinc | 0 | a 33 | 12 | 45 |
| Tributylboron | 38 | 0 | 0 | 38 |
| Triethylaluminum | 11 | 0 | 14 | 25 | a Intrinsic viscosity: 0.92 measured in chloroform at 25° C.

EXAMPLE 4

0.00125 mol. of diethylzinc was dissolved in 220 ml. of solvent under nitrogen atmosphere, then said solution was cooled to −78° C. 0.25 mol. of acetaldehyde previously cooled to −78° C. was added dropwise, while stirring, into said solution for 1 hour, and the reaction mixture was stood at −78° C. for additional 20 hours.

Toluene, n-hexane and diethylether were used as solvent and Table 2 records the results.

*Table 2.—Effect of solvent*

| Solvent | Yield of Polymer (Percent) | | | Sum. |
|---|---|---|---|---|
| | Soluble in methanol | Soluble in chloroform | Insoluble part | |
| Toluene | 0 | 0 | 6 | 6 |
| n-Hexane | 14 | 4 | 11 | 29 |
| Diethylether | 0 | 1 | 6 | 7 |

EXAMPLE 5

Metallic magnesium was reacted with ethyl bromide in diethylether to give 30 ml. of the Grignard solution, where there was 0.0125 mol. of $C_2H_5MgBr$. 0.25 mol. of gaseous acetaldehyde was introduced to and condensed on said Grignard solution at −78° C. The reaction mixture was stood at −78° C. for 20 hours. 0.3 gr. of polymer soluble in methanol and 2.6 grs. of polymer insoluble in both methanol and chloroform were obtained.

EXAMPLE 6

0.0125 mol. of diethylzinc was dissolved in 30 ml. of n-hexane under nitrogen atmosphere and 0.225 ml. (0.0125 mol.) of water was introduced at room temperature with gentle stirring. 0.25 mol. of acetaldehyde was polymerized on said solution on the same process as in Example 5. 0.55 gr. of polymer soluble in methanol, 0.66 gr. of polymer soluble in chloroform and 2.31 grs. of polymer insoluble in both methanol and chloroform were obtained.

EXAMPLE 7

0.25 mol. (18 ml.) of propionaldehyde was polymerized in the presence of 0.0125 mol. of diethylzinc in 30 ml. of n-hexane. The reaction was effected at a temperature of from −68° C. to −70° C. for 21.5 hours. 0.6 gr. of polymer soluble in chloroform and 4.15 grs. of polymer insoluble in chloroform were obtained. The overall conversion was 33%.

EXAMPLE 8

Propionaldehyde was polymerized with the use of 0.0125 mol. of triethylaluminum instead of diethylzinc to give 6.41 grs. of white resinous solid polymer insoluble in methanol. The conversion was 45%.

EXAMPLE 9

2.1 ml. (0.0213 mol.) of trichloroacetaldehyde (chloral anhydrate) was polymerized in the presence of 0.0125 mol. of diethylzinc in 30 ml. of n-hexane to give 1.4 grs. of white solid polymer insoluble in both methanol and chloroform. (Conversion 45%.)

EXAMPLE 10

12.5 ml. (0.125 mol.) trichloroacetaldehyde was polymerized in the presence of 0.00625 mol. of diethylzinc in 30 ml. of toluene to give 1.1 grs. of white resinous solid insoluble in both methanol and cholorform. (Conversion 6%.)

EXAMPLE 11

Trichloroacetaldehyde was polymerized with the use of 0.00625 mol. of triethylaluminum instead of diethylzinc on the same process as in Example 4 and 8.0 grs. of white solid were produced.

EXAMPLE 12

0.25 mol. (14.5 grs.) of propionaldehyde was polymerized in the presence of 0.0125 mol. of diethylcadmium to give 0.6 gr. of polymer soluble in methanol, 0.6 gr. of polymer soluble in chloroform and 2.9 grs. of polymer insoluble in both said solvents.

EXAMPLE 13

0.25 mol. (36.6 grs.) of trichloroacetaldehyde was polymerized with the use of diethylcadmium catalyst. 8.5 grs. of polymer insoluble in organic solvents were obtained.

EXAMPLE 14

0.25 mol (14.5 grs.) of propionaldehyde was polymerized in the presence of 0.0125 mol. of lithium aluminum hydride in 30 ml. of diethylether for 20 hours by the same process as in Example 7. 1.75 grs. of resinous solid insoluble in organic solvents were obtained.

EXAMPLE 15

0.25 mol. (36.6 grs.) of trichloroacetaldehyde was polymerized with the use of the same catalyst and under the same condition as in Example 14 and 3.3 grs. of resinous solid insoluble in organic solvents were prepared.

EXAMPLE 16

0.0125 mol. of diethylzinc was dissolved in 30 ml. of n-hexane under nitrogen atmosphere and 0.225 ml. (0.0125 mol.) of water was added with gentle stirring at room temperature. 0.25 mol. (14.5 grs.) of propionaldehyde was polymerized with the use of said reaction mixture for 20 hours by the same procedure as in Example 1. 6.5 grs. of resinous solid insoluble in organic solvents were produced.

EXAMPLE 17

0.25 mol. (36.6 grs.) of trichloroacetaldehyde was polymerized by the same method as in Example 16 to give 5.1 grs. of resinous solid insoluble in organic solvents.

What we claim is:

1. A process for preparing high molecular weight polymers of aldehydes which comprises: polymerizing an aldehyde having the general formula RCHO wherein R represents a radical selected from the group consisting of methyl, ethyl and trichloromethyl, with organometallic compounds as the polymerization catalyst, said organometallic compounds having the formula $MeR_n$, wherein Me is a metal of valence $n$ selected from the group consisting of zinc, aluminum, boron, magnesium and cadmium and R represents a saturated aliphatic hydrocarbon having from two to four carbon atoms.

2. The process as defined in claim 1 wherein the aldehyde is acetaldehyde and the polymerization reaction is conducted at a temperature between room temperature and —123.5° C.

3. The process as defined in claim 1 wherein Me is zinc.

4. The process as defined in claim 1 wherein Me is aluminum.

5. The process as defined in claim 1 wherein Me is boron.

6. The process as defined in claim 1 wherein Me is magnesium.

7. The process as defined in claim 1 wherein Me is cadmium.

References Cited by the Examiner

UNITED STATES PATENTS

| | | | |
|---|---|---|---|
| 2,274,749 | 3/42 | Smyers | 260—67 |
| 2,848,437 | 8/58 | Langsdorf et al. | 260—67 |
| 2,924,589 | 2/60 | Jurgeleit | 260—67 |
| 3,094,509 | 6/63 | Furukawa et al. | 260—67 |

FOREIGN PATENTS 766,629   1/57   Great Britain.

OTHER REFERENCES

Meerwein et al.: Journal fur Praktische Chemie N.F. Bd. 147 (1936), pp. 226–250.

Bevington et al.: Proceedings of the Royal Society (London), vol. A 196 (1949), pages 363–378.

Natta et al.: Die Makromoleculare Chemie, 37, April 1960, p. 156–159.

Letort et al.: Comptes Rendus, vol. 241 (1955), pp. 1765–1767.

Derwent: Belgian Patents Report, vol. 59A (November 1959), AA17–18, For. Pat. Jor.

WILLIAM H. SHORT, *Primary Examiner.*

H. N. BURSTEIN, *Examiner.*